United States Patent
Nielsen

(10) Patent No.: US 10,618,463 B2
(45) Date of Patent: Apr. 14, 2020

(54) PARKING LIGHT SYSTEM FOR VEHICLES

(71) Applicant: Kipling Christopher Nielsen, San Francisco, CA (US)

(72) Inventor: Kipling Christopher Nielsen, San Francisco, CA (US)

( * ) Notice: Subject to any disclaimer, the term of this patent is extended or adjusted under 35 U.S.C. 154(b) by 0 days.

(21) Appl. No.: 15/784,482

(22) Filed: Oct. 16, 2017

(65) Prior Publication Data

US 2019/0111834 A1 Apr. 18, 2019

(51) Int. Cl.
*B60Q 1/14* (2006.01)
*B60Q 1/48* (2006.01)
*B60Q 1/30* (2006.01)
*B60Q 1/34* (2006.01)

(52) U.S. Cl.
CPC ............. *B60Q 1/488* (2013.01); *B60Q 1/302* (2013.01); *B60Q 1/343* (2013.01)

(58) Field of Classification Search
CPC .... B60Q 1/1407; B60Q 1/143; B60Q 1/2603; B60Q 1/2607; B60Q 1/302; B60Q 1/343; B60Q 1/488
USPC ....................................... 315/77, 82
See application file for complete search history.

(56) References Cited

U.S. PATENT DOCUMENTS

| | | | | |
|---|---|---|---|---|
| 5,592,146 A * | 1/1997 | Kover, Jr. | ............. | B60Q 1/143 307/10.8 |
| 6,711,481 B1 * | 3/2004 | King | ....................... | B60Q 1/14 315/82 |
| 2008/0007180 A1 * | 1/2008 | Kesterson | ............ | B60Q 1/2603 315/82 |
| 2010/0244698 A1 * | 9/2010 | Nakamura | ............. | B60Q 1/323 315/77 |
| 2016/0023589 A1 * | 1/2016 | Warner | ................. | B60Q 1/0094 315/77 |
| 2016/0264039 A1 * | 9/2016 | Ekladyous | ........... | B60Q 1/1407 |
| 2016/0306030 A1 * | 10/2016 | Hara | ..................... | G01S 7/4813 |

* cited by examiner

*Primary Examiner* — Tung X Le
(74) *Attorney, Agent, or Firm* — The Iwashko Law Firm, PLLC; Lev Ivan Gabriel Iwashko

(57) ABSTRACT

A vehicle implementing a parking light system, the parking light system including at least one parking light disposed at a rear portion of the vehicle, a turn signal switch to move in an upward direction and downward direction, and a sensor to transmit a signal to the at least parking light in response to the turn signal switch moving in one of the upward direction and downward direction, such that the at least one parking light illuminates in response to receiving the signal.

15 Claims, 8 Drawing Sheets

PARKING LIGHT SYSTEM FOR VEHICLES

BACKGROUND OF THE INVENTION

1. Field of the Invention

The present general inventive concept relates generally to vehicle light systems and, more specifically, to parking lights for a vehicle.

2. Description of the Related Art

When a driver desires to parallel park a vehicle in an empty parking spot, it is common practice for the driver to switch on a turn signal in a direction of the empty parking spot in order to notify other drivers in other vehicles of the driver's intention to parallel-park the vehicle in the empty parking spot.

However, a flashing turn signal may confuse the other drivers if the vehicle is close to an intersection, because the other drivers may think that the vehicle intends to make a turn at the intersection. Likewise, the driver who switched in the turn signal in the direction of the empty parking space may have to roll down a window to signal to the other drivers to go around the vehicle so that traffic is not impeded.

Therefore, there is a need for a parking light system to indicate to other drivers of a driver's intention to parallel-park a vehicle in an empty parking spot.

SUMMARY

The present general inventive concept provides a vehicle implementing a parking light system.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a vehicle implementing a parking light system, the parking light system including at least one parking light disposed at a rear portion of the vehicle, a turn signal switch to move in an upward direction and downward direction, and a sensor to transmit a signal to the at least parking light in response to the turn signal switch moving in one of the upward direction and downward direction, such that the at least one parking light illuminates in response to receiving the signal.

The vehicle may further include a right rear turn signal to blink in response to the turn signal switch being moved in an upward direction to a first upward position, and a left rear turn signal to blink in response to the turn signal switch being moved in a downward direction to a first downward position.

The at least one parking light may illuminate in response to the turn signal switch being moved in at least of the upward direction to a second upward position and the downward direction to a second downward position.

The vehicle may further include a rear windshield disposed at the rear portion of the vehicle, wherein at least one parking light is disposed at a top portion of the rear windshield.

The at least one parking light may be a single light extending across at least a portion of the top portion of the rear windshield.

The at least one parking light may include a first light disposed on a left side of at least a portion of the top portion of the rear windshield and a second light disposed on a right side of at least another portion of the top portion of the rear windshield.

The vehicle may further include a rear windshield disposed at the rear portion of the vehicle, wherein the at least one parking light is disposed on or within the rear windshield.

The at least one parking light may be at least one of a matrix of very small lights and light-strings disposed across an entirety of the rear windshield.

The vehicle may further include a rear windshield frame disposed at the rear portion of the vehicle, wherein the at least one parking light is disposed around at least a portion of the rear windshield frame.

The vehicle may further include a trunk disposed at the rear portion of the vehicle, wherein the at least one parking light is disposed at at least a portion of the trunk.

The vehicle may further include a rear end at the rear portion of the vehicle, wherein the at least one parking light is disposed at at least a portion of the rear end.

The vehicle may further include a rear end at the rear portion of the vehicle, wherein the at least one parking light is disposed at the rear end.

The vehicle may further include a bumper, wherein the at least one parking light is disposed at at least a portion of the bumper.

The foregoing and/or other features and utilities of the present general inventive concept may also be achieved by providing a parking light system for a vehicle, the parking light system including at least one parking light disposed at a rear portion of the vehicle, a turn signal switch to move in an upward direction and downward direction, and a sensor to transmit a signal to the at least parking light in response to the turn signal switch moving in one of the upward direction and downward direction, such that the at least one parking light illuminates in response to receiving the signal.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE INVENTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1A:
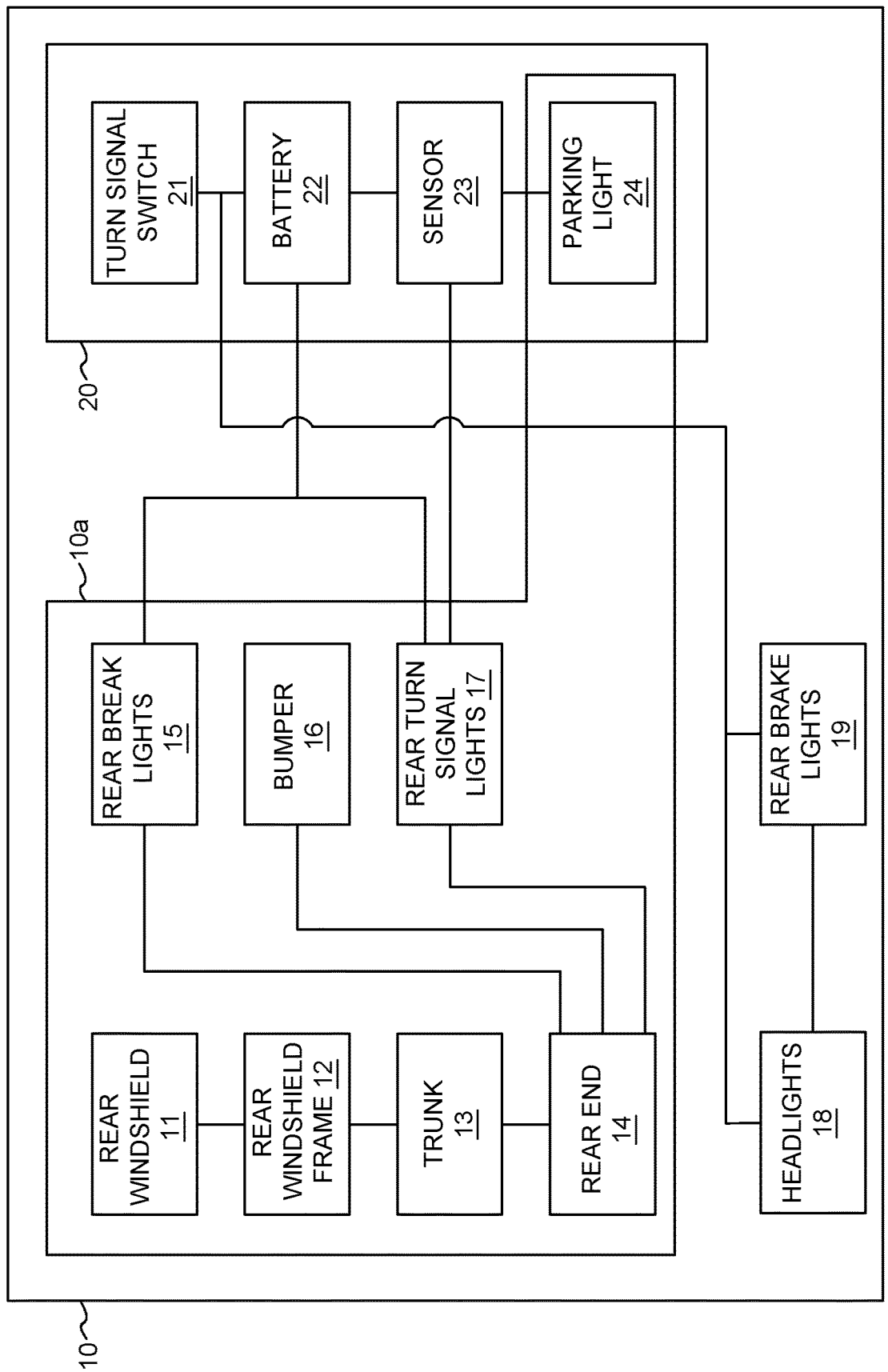
FIG. 1A is a block diagram illustrating a vehicle implementing a parking light system, according to an exemplary embodiment of the present general inventive concept.

FIG. 1A is a block diagram illustrating a vehicle 10 implementing a parking light system 20, according to an exemplary embodiment of the present general inventive concept.

Referring to FIG. 1A, the vehicle 10 may include all typical vehicle components included in conventional vehicles well known to one of ordinary skill in the art. For example, the vehicle 10 may include a rear portion 10a including a rear windshield 11, a rear windshield frame 12, a trunk 13, a rear end 14, rear brake lights 15, a bumper 16, and rear turn signal lights 17, headlights 18, and front turn signal lights 19, but is not limited thereto.

The parking light system 20 may include a turn signal switch 21, a battery 22, a sensor 23, and at least one parking light 24.

As illustrated in FIG. 1A, the may be connected to, disposed on, or be a part of, at least one of the rear windshield 11, the rear windshield frame 12, the trunk 13, the rear end 14, and the bumper 16.

Figure 1B:
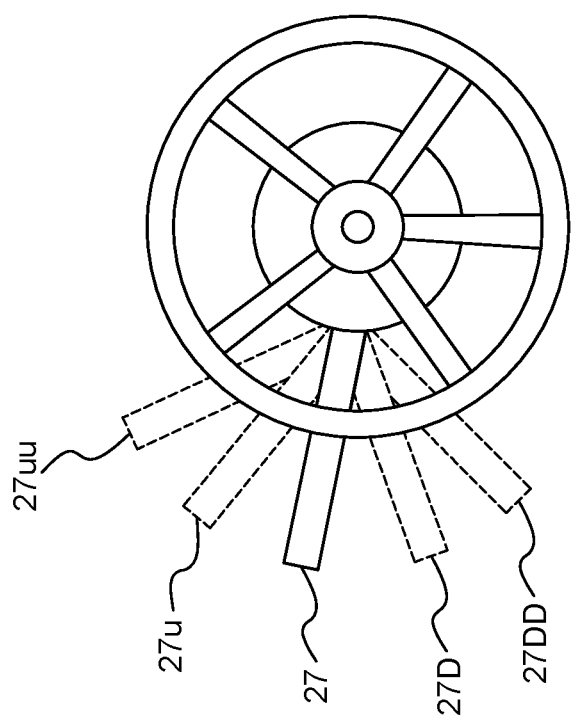
FIG. 1B is a zoomed-in illustration of a turn signal switch, accordingly to an exemplary embodiment of the present general inventive concept.

FIG. 1B is a zoomed-in illustration of the turn signal switch 21, accordingly to an exemplary embodiment of the present general inventive concept.

Referring to FIGS. 1A and 1B, the turn signal switch 21 may be pushed upward to a first upward position 21U to turn on a right rear turn signal light 17R and a right front turn signal light 19R, to alert pedestrians and other drivers in other vehicles of the driver's intention to make a right-hand turn. Likewise, the turn signal switch 21 may be pushed downward to a first downward position 21D to turn on a left rear turn signal light 17L and a left front turn signal light 19L, to alert the pedestrians and the other drivers in other vehicles of the driver's intention to make a left hand turn.

More specifically, the sensor 23 may transmit a signal to the rear turn signal lights 17 and the front turn signal lights 19 in response to the pushing of the turn signal switch 21, such that the rear turn signal lights 17 and the front turn signal lights 19 are turned on. When the rear turn signal lights 17 and the front turn signal lights 19 are turned on, they may illuminate, flash, twitter, flitter, and/or blink.

The at least one front parking light 24 may be disposed at the rear portion 10a of the vehicle 10. To illuminate the at least one front parking light 24, the driver may push the turn signal switch 21 upward a second time to a second upward position 21UU, or alternatively, downward a second time to a second downward position 21DD.

When the turn signal switch 21 is pushed upward the second time to the second upward position 21UU, the right rear turn signal light 17R and the right front turn signal light 19R may continue to blink, and the at least one front parking light 24 may be illuminated to alert the pedestrians and the other drivers in other vehicles of the driver's intention to parallel-park the vehicle 10 in a right parking spot on a right side of a street.

When the turn signal switch 21 is pushed downward the second time to the second downward position 21DD, the left rear turn signal light 17L and the left front turn signal light 19L may continue to blink, and the at least one front parking light 24 may be illuminated to alert the pedestrians and the other drivers in other vehicles of the driver's intention to parallel-park the vehicle 10 in a left parking spot on a left side of the street.

The battery 22 may provide power to the vehicle 10, such that all electronic components within the vehicle 10 requiring power may function. For example, the battery 22 may provide power to the sensor 23, the rear turn signal lights 17, the front turn signal lights 19, and the at least one front parking light 24, such that the rear turn signal lights 17, the front turn signal lights 19, and the at least one front parking light 24 turn on in response to the turn signal switch being manipulated by the driver.

The rear turn signal lights 17, the front turn signal lights 19, and the at least one front parking light 24 may be a series of light emitting diodes, halogen lights, fluorescent lights, incandescent lights, or any other types of lights that are clearly visible by pedestrians. Moreover, the at least one parking light 24 may be any color, including red, white, green, blue, purple, yellow, orange, etc., but is not limited thereto.

The following exemplary embodiments of FIGS. 2 through 7 include different positions of parking lights on the vehicle 10, which all may function in a similar manner as described above with reference to FIG. 1. Accordingly, the other elements of the parking light system 20, such as the brake pedal 21, the battery 22, the sensor 23, may function in a similar manner as described above with reference to FIG. 1.

Figure 2:
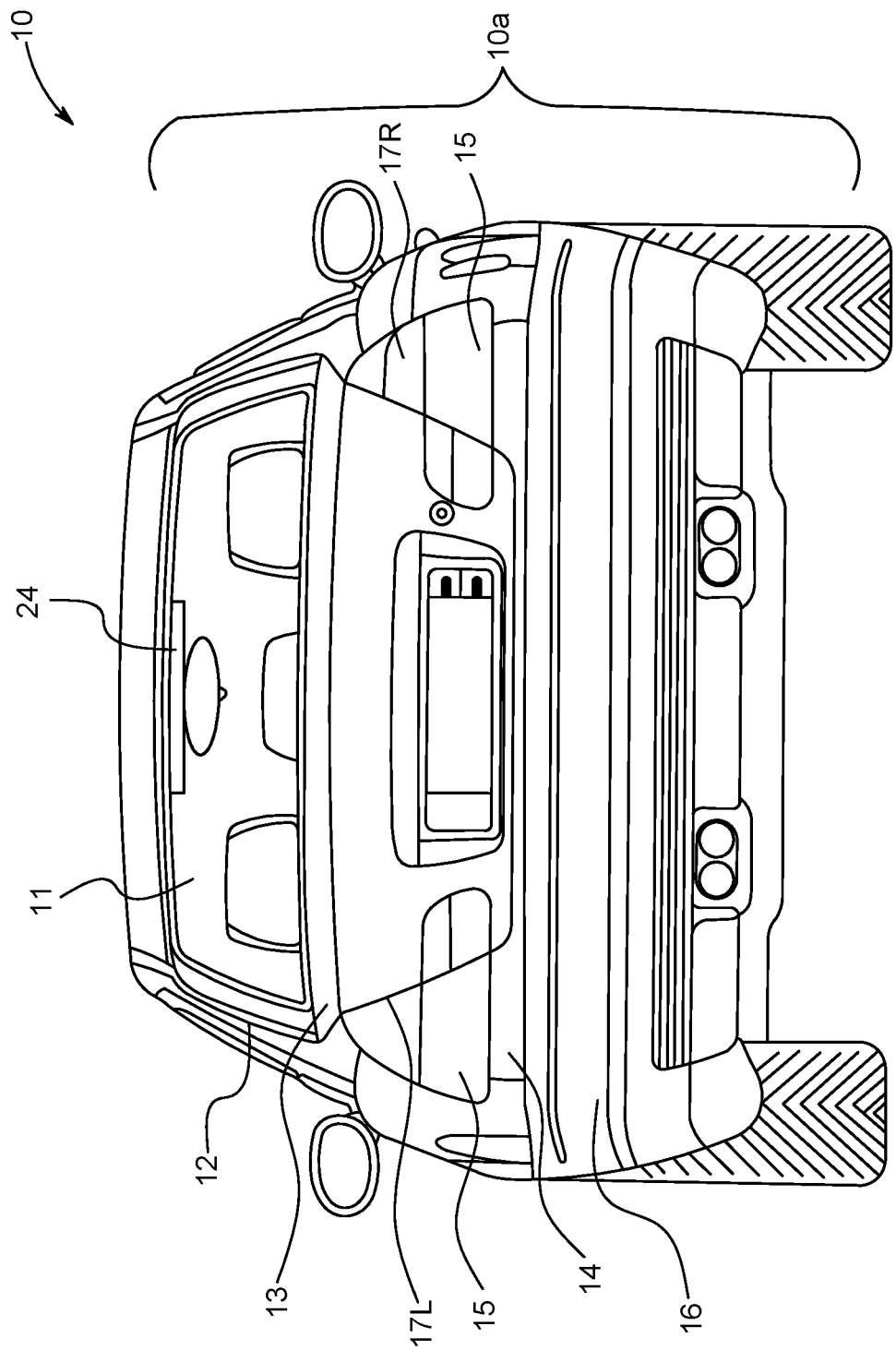
FIG. 2 is a rear view of a vehicle implementing the at least one parking light disposed at a top portion of a rear windshield, according to an exemplary embodiment of the present general inventive concept.

FIG. 2 is a rear view of the vehicle 10 implementing the at least one parking light 24 disposed at a top portion of the rear windshield 11, according to an exemplary embodiment of the present general inventive concept.

Referring to FIG. 2, the at least one parking light 24 may be disposed on the top portion of the rear windshield 11. The at least one parking light 24 may include a single light extending across the top portion of the rear windshield 11, or alternatively, may include a plurality of parking lights 24 disposed on left and right sides of the top portion of the rear windshield 11.

Figure 3:
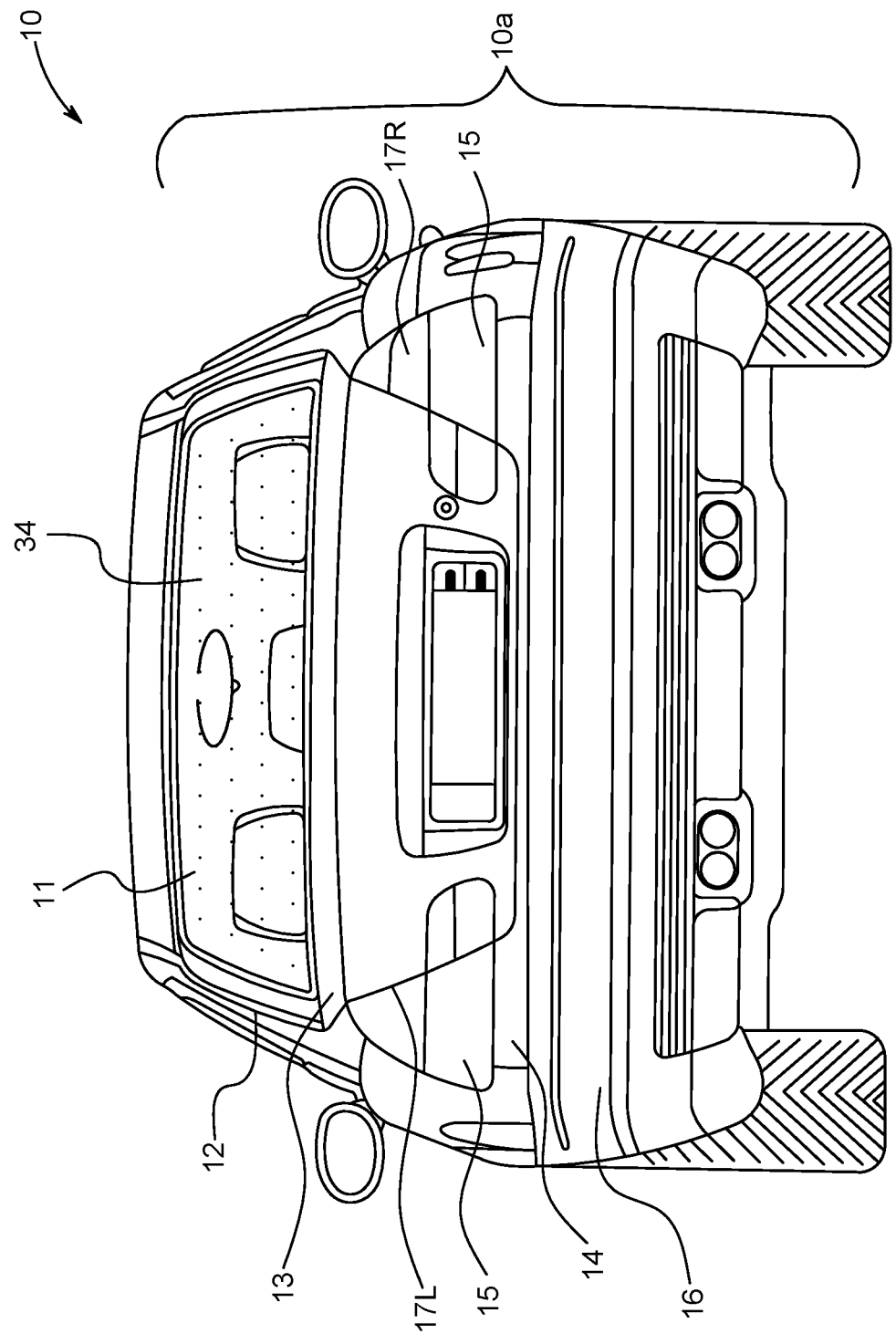
FIG. 3 is a rear view of a vehicle implementing the at least one parking light disposed at a rear windshield, according to another exemplary embodiment of the present general inventive concept.

FIG. 3 is a rear view of the vehicle 10 implementing the at least one parking light 34 disposed at the rear windshield 11, according to another exemplary embodiment of the present general inventive concept.

Referring to FIG. 3, the at least one parking light 34 may be disposed on the entire rear windshield 11 as a matrix of very small lights or light-strings disposed across an entirety of the rear windshield 11, which cause the entire rear windshield 11 to appear illuminated when the turn signal switch 21 is manipulated by the driver into the second upward position 21UU or the second downward position 21DD. The at least one parking light 34 may be relatively transparent and/or translucent, in order to allow the driver to clearly see through the rear windshield 11, even when the at least one parking light 34 is illuminated.

Figure 4:
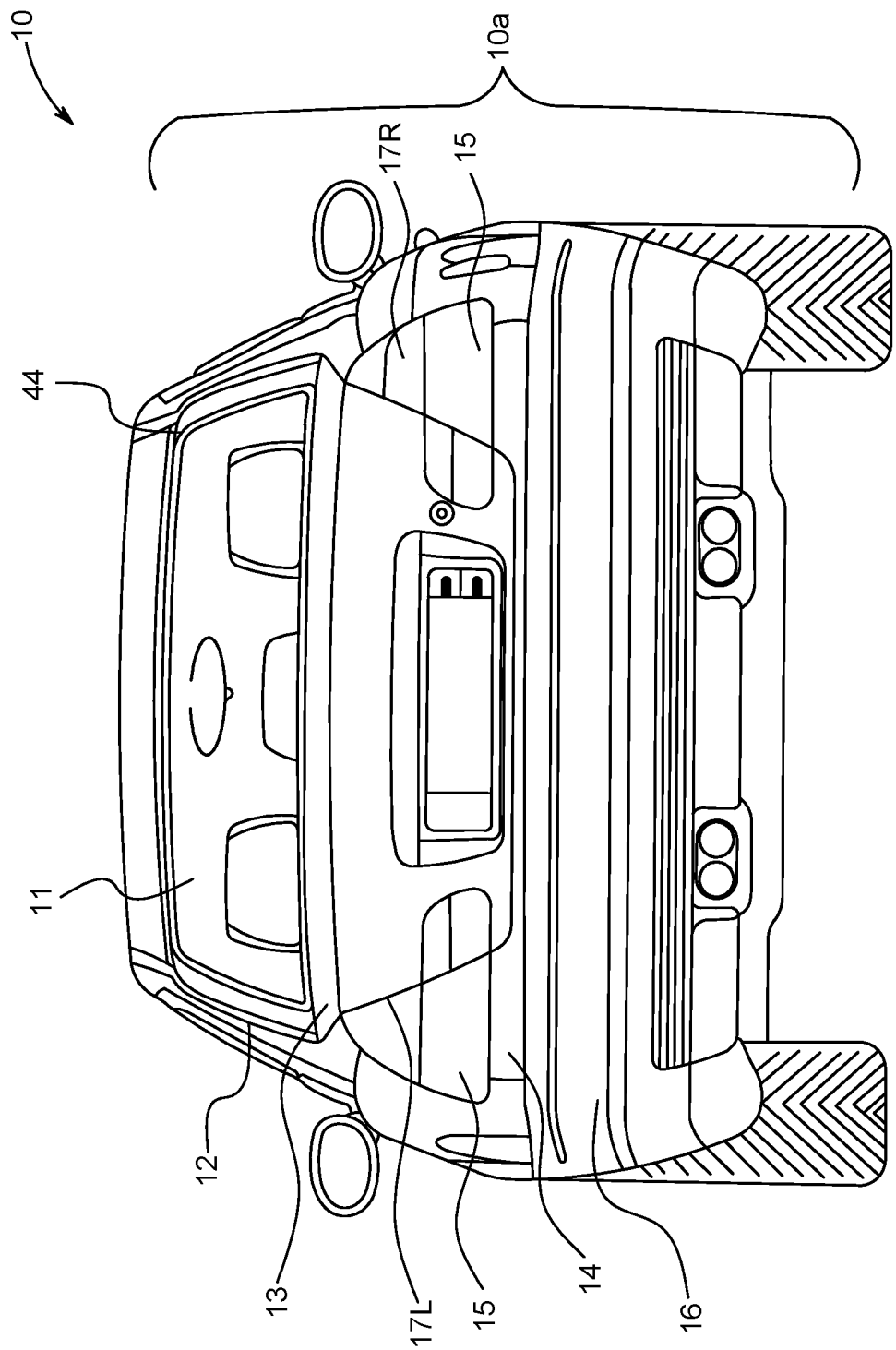
FIG. 4 is a rear view of a vehicle implementing the at least one parking light disposed at a rear windshield frame, according to another exemplary embodiment of the present general inventive concept.

FIG. 4 is a rear view of the vehicle 10 implementing the at least one parking light 44 disposed at the rear windshield frame 12, according to another exemplary embodiment of the present general inventive concept.

Referring to FIG. 4, the at least one parking light 44 may be disposed on an entirety of the rear windshield frame 12, or just a portion thereof, such the at least one parking light 44 is clearly visible to pedestrians when illuminated.

Figure 5:
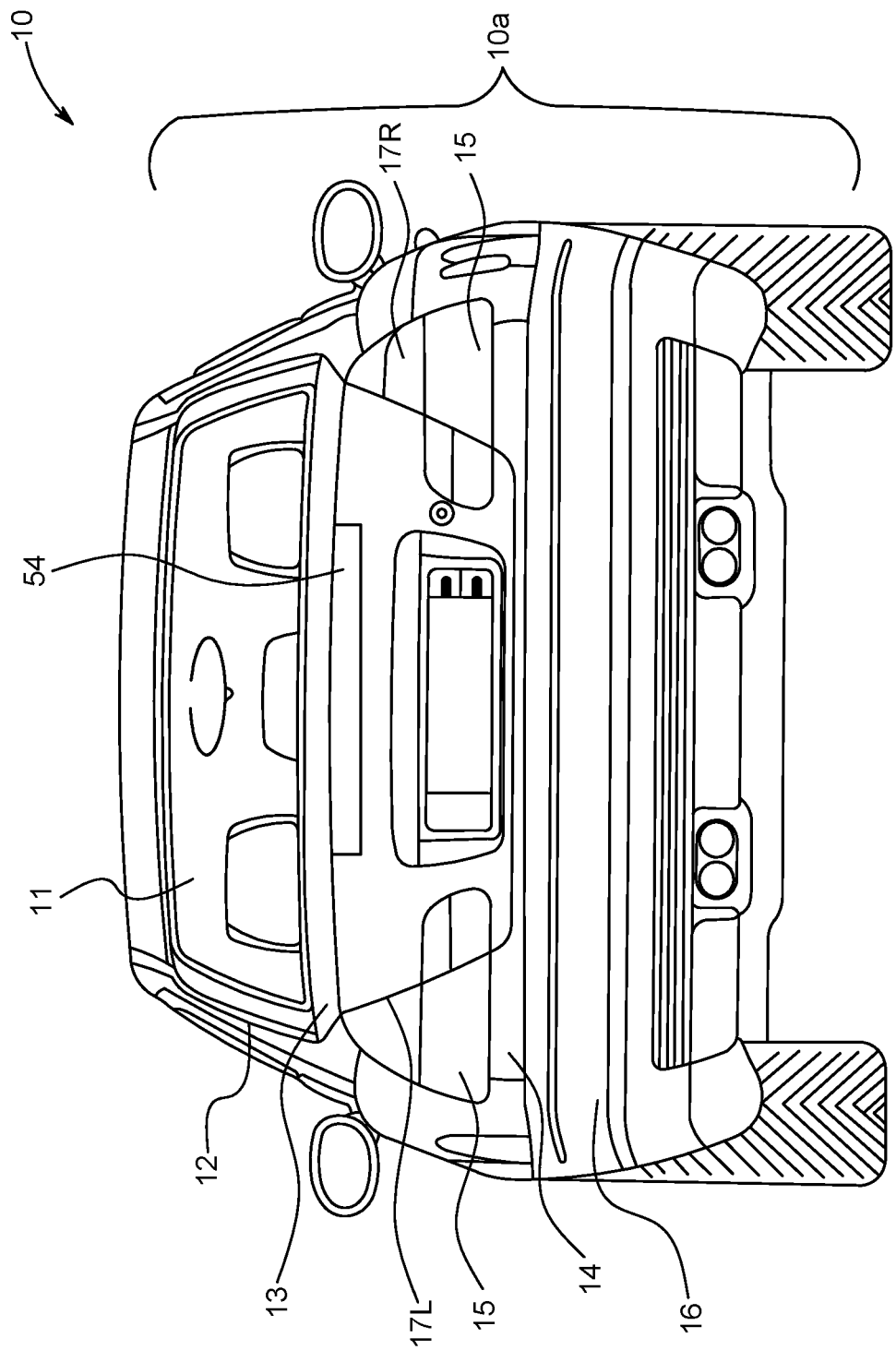
FIG. 5 is a rear view of a vehicle implementing the at least one parking light disposed at a trunk, according to another exemplary embodiment of the present general inventive concept.

FIG. 5 is a rear view of the vehicle 10 implementing the at least one parking light 54 disposed at the trunk 13, according to another exemplary embodiment of the present general inventive concept.

Referring to FIG. 5, the at least one parking light 54 may be disposed on at least a portion of the trunk 13, such the at least one parking light 54 is clearly visible to pedestrians when illuminated.

Figure 6:
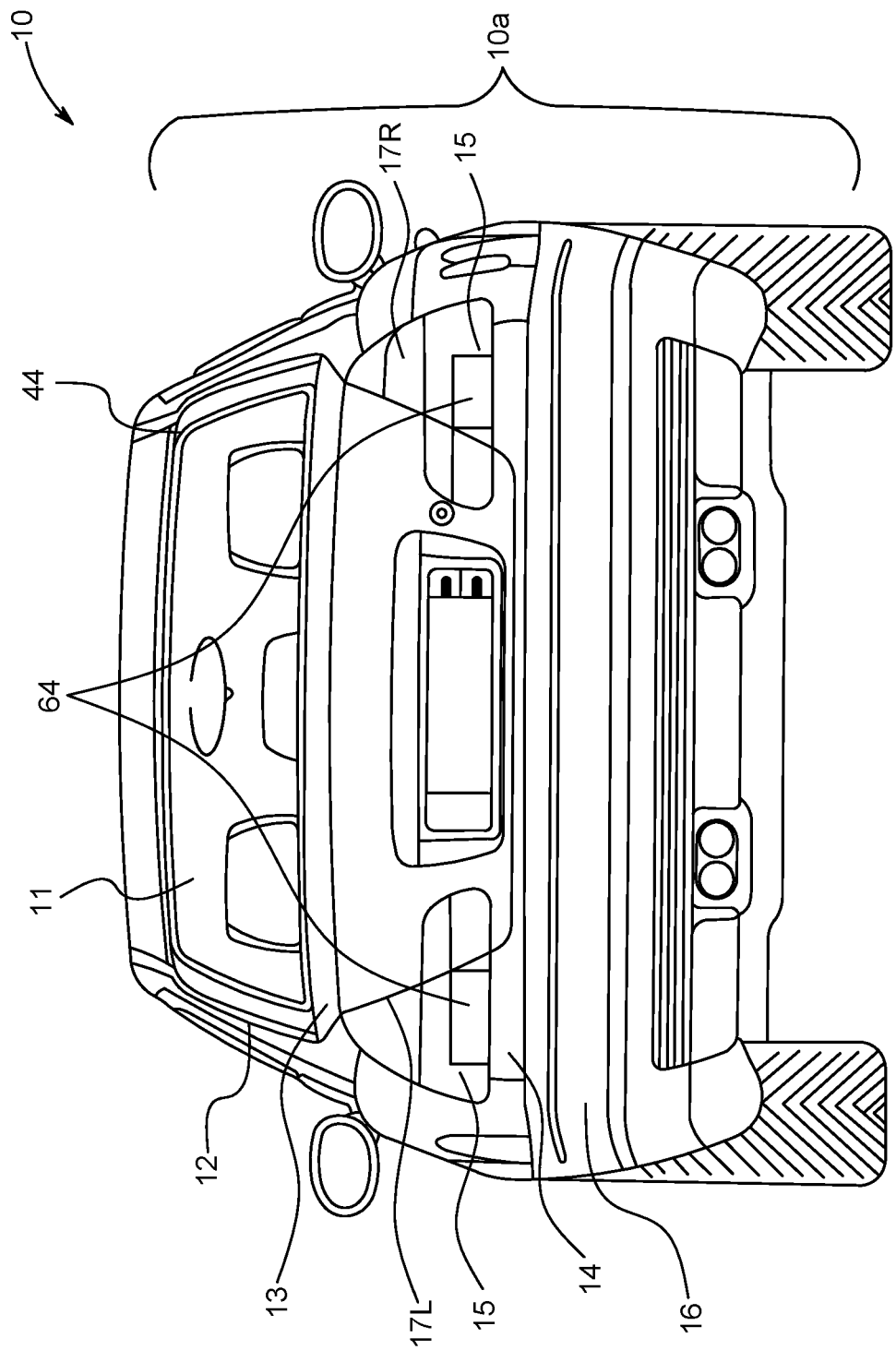
FIG. 6 is a rear view of a vehicle implementing the at least one parking light disposed at a rear end, according to another exemplary embodiment of the present general inventive concept.

FIG. 6 is a rear view of the vehicle 10 implementing the at least one parking light 64 disposed at the rear end 14, according to another exemplary embodiment of the present general inventive concept.

Referring to FIG. 6, the at least one parking light 64 may be disposed on at least a portion of the rear end 14, for example, near the rear brake lights 15, such the at least one parking light 64 is clearly visible to pedestrians when illuminated.

Figure 7:
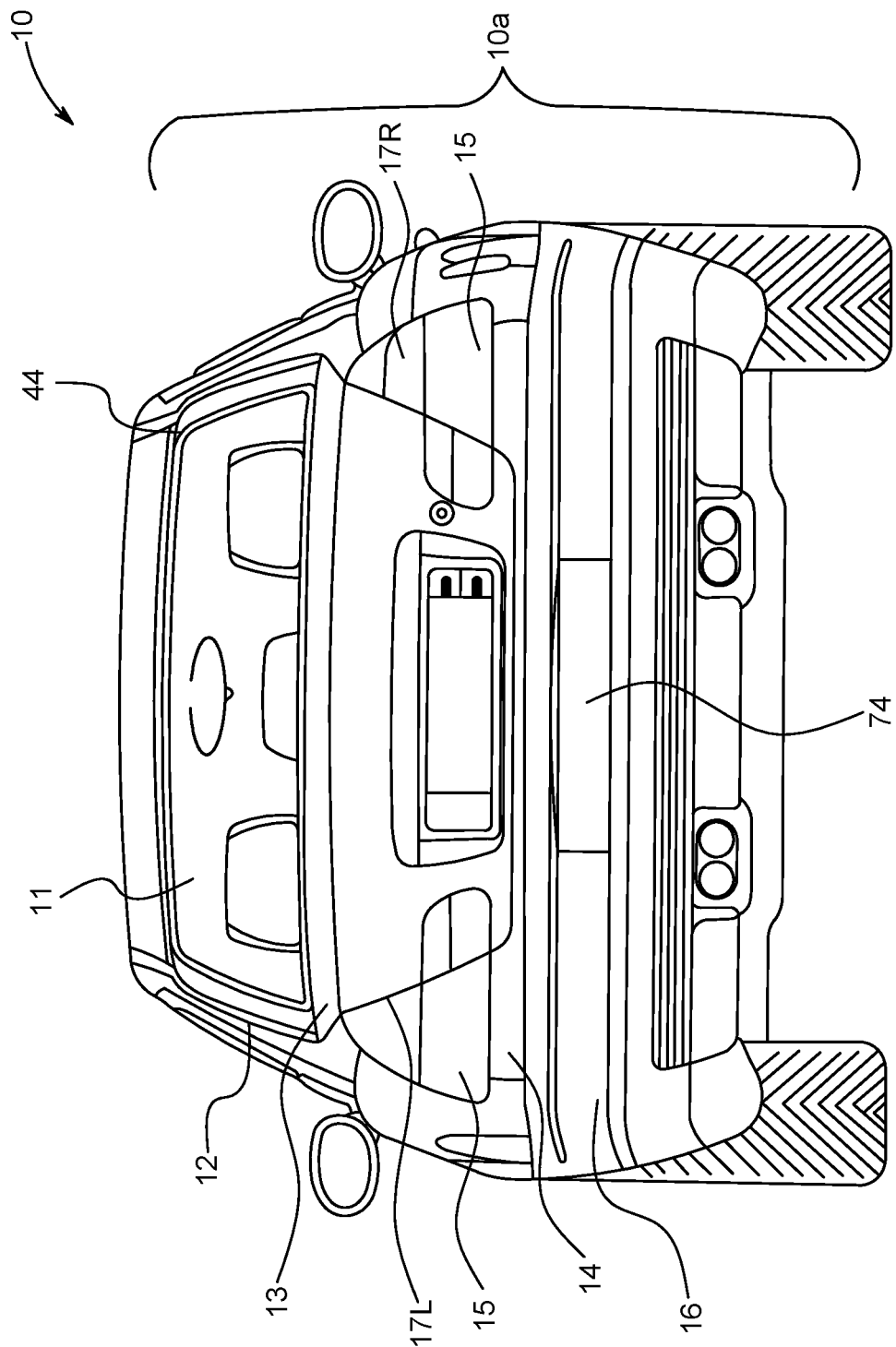
FIG. 7 is a rear view of a vehicle implementing the at least one parking light disposed at a bumper, according to another exemplary embodiment of the present general inventive concept.

FIG. 7 is a rear view of the vehicle 10 implementing the at least one parking light 74 disposed at the bumper 16, according to another exemplary embodiment of the present general inventive concept.

Referring to FIG. 7, the at least one parking light 74 may be disposed on at least a portion of the bumper 16, such the at least one parking light 74 is clearly visible to pedestrians when illuminated.

Additionally, the at least one parking light may be disposed on a front portion, a back portion, a side portion, a top portion, and/or a bottom portion of side mirrors on the vehicle.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A vehicle implementing a parking light system, the parking light system comprising:
   at least one parking light disposed at a rear portion of the vehicle;
   a turn signal switch to move in an upward direction and downward direction; and
   a sensor to transmit a signal to the at least one parking light after the turn signal switch moves in one of the upward direction and downward direction, such that the at least one parking light illuminates in response to receiving the signal.

2. The vehicle of claim 1, further comprising:
   a right rear turn signal to blink in response to the turn signal switch being moved in an upward direction to a first upward position; and
   a left rear turn signal to blink in response to the turn signal switch being moved in a downward direction to a first downward position.

3. The vehicle of claim 2, wherein the at least one parking light illuminates in response to the turn signal switch being moved in at least of the upward direction to a second upward position and the downward direction to a second downward position.

4. The vehicle of claim 1, further comprising:
   a rear windshield disposed at the rear portion of the vehicle, wherein at least one parking light is disposed at a top portion of the rear windshield.

5. The vehicle of claim 4, wherein the at least one parking light is a single light extending across at least a portion of the top portion of the rear windshield.

6. The vehicle of claim 4, wherein the at least one parking light includes a first light disposed on a left side of at least a portion of the top portion of the rear windshield and a second light disposed on a right side of at least another portion of the top portion of the rear windshield.

7. The vehicle of claim 1, further comprising:
   a rear windshield disposed at the rear portion of the vehicle, wherein the at least one parking light is disposed on or within the rear windshield.

8. The vehicle of claim 7, wherein the at least one parking light is at least one of a matrix of very small lights and light-strings disposed across an entirety of the rear windshield.

9. The vehicle of claim 1, further comprising:
a rear windshield frame disposed at the rear portion of the vehicle, wherein the at least one parking light is disposed around at least a portion of the rear windshield frame.

10. The vehicle of claim 1, further comprising:
a trunk disposed at the rear portion of the vehicle, wherein the at least one parking light is disposed on at least a portion of the trunk.

11. The vehicle of claim 1, further comprising:
a rear end at the rear portion of the vehicle, wherein the at least one parking light is disposed on at least a portion of the rear end.

12. The vehicle of claim 1, further comprising:
a rear end at the rear portion of the vehicle, wherein the at least one parking light is disposed at the rear end.

13. The vehicle of claim 1, further comprising:
a bumper, wherein the at least one parking light is disposed s at least a portion of the bumper.

14. A parking light system for a vehicle, the parking light system comprising:
at least one parking light disposed at a rear portion of the vehicle;
a turn signal switch to move in an upward direction and downward direction;
a sensor to transmit a signal to the at least parking light after the turn signal switch moving in one of the upward direction and downward direction, such that the at least one parking light illuminates in response to receiving the signal;
a right rear turn signal to blink after the turn signal switch is moved in an upward direction to a first upward position; and
a left rear turn signal to blink after the turn signal switch is moved in a downward direction to a first downward position.

15. A vehicle implementing a parking light system, the parking light system comprising:
at least one turn signal light disposed at a rear portion of the vehicle;
at least one parking light disposed at the rear portion of the vehicle;
a turn signal switch to move in at least one direction, such that the at least one turn signal light blinks in response to the turn signal switch moving in the at least one direction to a first position; and
a sensor to transmit a signal to the at least one parking light in response to the turn signal switch moving in the at least one direction to a second position, such that the at least one parking light illuminates in response to receiving the signal.

* * * * *